United States Patent
Lee et al.

(10) Patent No.: US 10,321,454 B2
(45) Date of Patent: Jun. 11, 2019

(54) METHOD FOR MONITORING DOWNLINK CONTROL CHANNEL IN WIRELESS COMMUNICATION SYSTEM AND DEVICE FOR SAME

(71) Applicant: LG ELECTRONICS INC., Seoul (KR)

(72) Inventors: Seungmin Lee, Seoul (KR); Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 14/758,758

(22) PCT Filed: Jan. 2, 2014

(86) PCT No.: PCT/KR2014/000018
§ 371 (c)(1),
(2) Date: Jun. 30, 2015

(87) PCT Pub. No.: WO2014/107033
PCT Pub. Date: Jul. 10, 2014

(65) Prior Publication Data
US 2015/0358962 A1 Dec. 10, 2015

Related U.S. Application Data

(60) Provisional application No. 61/748,125, filed on Jan. 1, 2013, provisional application No. 61/818,914, filed on May 2, 2013.

(51) Int. Cl.
*H04W 72/04* (2009.01)
*H04L 27/26* (2006.01)
(Continued)

(52) U.S. Cl.
CPC ......... *H04W 72/0446* (2013.01); *H04L 5/005* (2013.01); *H04L 5/0035* (2013.01);
(Continued)

(58) Field of Classification Search
CPC .................................................. H04W 72/0446
(Continued)

(56) References Cited

U.S. PATENT DOCUMENTS 9,686,772 B2 * 6/2017 Chen ................. H04W 72/0406
2012/0113869 A1 5/2012 Gaal et al.
(Continued)

FOREIGN PATENT DOCUMENTS

CN 102624490 A 8/2012
CN 102684855 A 9/2012
(Continued)

*Primary Examiner* — Robert M Morlan
*Assistant Examiner* — Pamit Kaur
(74) *Attorney, Agent, or Firm* — Birch, Stewart, Kolasch & Birch, LLP

(57) ABSTRACT

The present invention relates to a method and a device by which a user equipment monitors a downlink control channel in a wireless communication system. More specifically, the method comprises a step of monitoring the downlink control channel on a flexible downlink subframe, wherein the flexible downlink subframe is obtained by reconfiguring, for downlink communication, an uplink subframe configured according to a reference UL-DL configuration, the reference UL-DL configuration is configured by the combination of a first UL-DL configuration set for a first cell and a second UL-DL configuration set for a second cell, and the first UL-DL configuration and the second UL-DL configuration are configured so as to change the usage of wireless resources.

8 Claims, 9 Drawing Sheets

(51) Int. Cl.
*H04W 24/08* (2009.01)
*H04L 5/00* (2006.01)
*H04L 12/18* (2006.01)
*H04W 48/16* (2009.01)
*H04L 5/14* (2006.01)

(52) U.S. Cl.
CPC ............ *H04L 5/1469* (2013.01); *H04L 12/18* (2013.01); *H04L 27/26* (2013.01); *H04W 24/08* (2013.01); *H04W 48/16* (2013.01); *H04W 72/042* (2013.01)

(58) Field of Classification Search
USPC ........................................................ 370/336
See application file for complete search history.

(56) References Cited

U.S. PATENT DOCUMENTS

| | | | |
|---|---|---|---|
| 2012/0113875 A1 | 5/2012 | Alanärä et al. | |
| 2012/0230232 A1* | 9/2012 | Ji | H04B 7/2656 370/280 |
| 2012/0263057 A1* | 10/2012 | Choi | H04W 28/048 370/252 |
| 2012/0281601 A1 | 11/2012 | Kuo et al. | |
| 2014/0086224 A1 | 3/2014 | Kwon et al. | |
| 2014/0092878 A1* | 4/2014 | Davydov | H04W 4/70 370/336 |
| 2014/0119266 A1* | 5/2014 | Ng | H04L 1/0061 370/312 |
| 2014/0126490 A1* | 5/2014 | Chen | H04L 5/0048 370/329 |

FOREIGN PATENT DOCUMENTS

| | | |
|---|---|---|
| EP | 2 498 419 A2 | 9/2012 |
| EP | 2 993 819 A1 | 3/2016 |
| KR | 10-2012-0103200 A | 9/2012 |
| KR | 10-2012-0116271 A | 10/2012 |
| WO | WO 2012/106840 A1 | 8/2012 |
| WO | WO 2012/149673 A1 | 11/2012 |
| WO | WO 2012/173424 A2 | 12/2012 |

* cited by examiner

FIG. 2
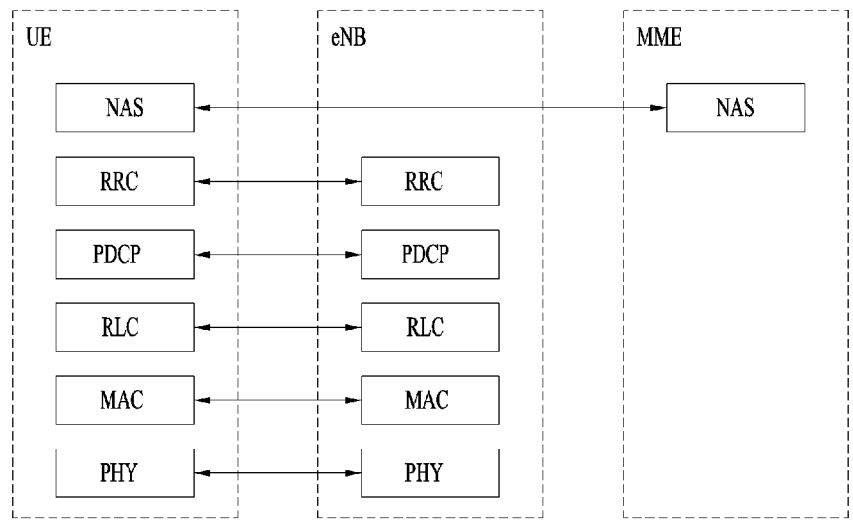
(A) CONTROL-PLANE PROTOCOL STACK
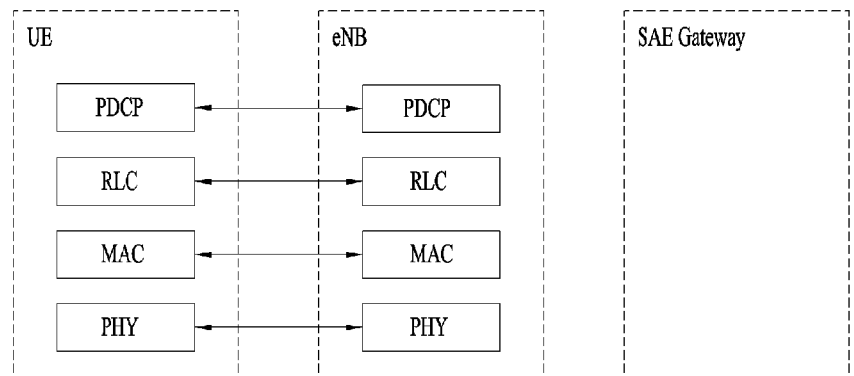
(B) USER-PLANE PROTOCOL STACK

◨ WHEN UPLINK SUBFRAME IS USED FOR DOWNLINK

METHOD FOR MONITORING DOWNLINK CONTROL CHANNEL IN WIRELESS COMMUNICATION SYSTEM AND DEVICE FOR SAME

CROSS REFERENCE TO RELATED APPLICATIONS

This application is the National Phase of PCT International Application No. PCT/KR2014/000018, filed on Jan. 2, 2014, which claims priority under 35 U.S.C. 119(e) to U.S. Provisional Application No. 61/748,125, filed on Jan. 1, 2013 and 61/818,914, filed on May 2, 2013, all of which are hereby expressly incorporated by reference into the present application.

TECHNICAL FIELD

The present invention relates to a wireless communication system and, more particularly, to a method and device for monitoring a downlink control channel in a wireless communication system.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method and device for monitoring a downlink control channel in a wireless communication system.

The technical problems solved by the present invention are not limited to the above technical problems and other technical problems which are not described herein will become apparent to those skilled in the art from the following description.

Technical Solution

The object of the present invention can be achieved by providing a method of monitoring a downlink control channel of a user equipment (UE) in a wireless communication system including monitoring the downlink control channel on a flexible downlink subframe, wherein the flexible downlink subframe is configured by reconfiguring, for downlink communication, an uplink subframe configured according to a reference uplink-downlink (UL-DL) configuration, wherein the reference UL-DL configuration includes a combination of a first UL-DL configuration configured for a first cell and a second UL-DL configuration configured for a second cell, and wherein the first UL-DL configuration and the second UL-DL configuration are configured to change use of radio resources.

The flexible downlink subframe may support only a transmission mode based on a cell-specific reference signal.

The flexible downlink subframe may have a first orthogonal frequency division multiplexing (OFDM) symbol assigned to an enhanced physical downlink control channel (EPDCCH).

The first and second UL-DL configurations may be linked to different enhanced downlink control channel (EPDCCH) sets. The flexible downlink subframe may be configured to monitor a specific EPDCCH set having quasi co-location with a UL-DL configuration configured for downlink communication at a time corresponding to the flexible downlink subframe, between the first and second UL-DL configurations.

The method may further include receiving a reconfiguration message including information indicating the flexible downlink subframe, and the reconfiguration message may be received using a physical channel signal.

The flexible downlink subframe may be configured such that a common reference signal (CRS) is not transmitted thereon.

A multicast broadcast single frequency network (MB-SFN) may be configured on the flexible downlink subframe.

In another aspect of the present invention, provided herein is a user equipment (UE) for monitoring a downlink control channel in a wireless communication system including a radio frequency unit and a processor, wherein the processor is configured to monitor the downlink control channel on a flexible downlink subframe, wherein the flexible downlink subframe is configured by reconfiguring, for downlink communication, an uplink subframe configured according to a reference uplink-downlink (UL-DL) configuration, wherein the reference UL-DL configuration includes a combination of a first UL-DL configuration configured for a first cell and a second UL-DL configuration configured for a second cell, and wherein the first UL-DL configuration and the second UL-DL configuration are configured to change use of radio resources.

Advantageous Effects

According to the present invention, when radio resources are dynamically changed according to system load in a wireless communication system, a downlink control channel can be efficiently monitored.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 2 is a diagram illustrating structures of a control plane and a user plane of a radio interface protocol between a user equipment and E-UTRAN based on the 3GPP radio access network standard.

BEST MODE

Figure 1:
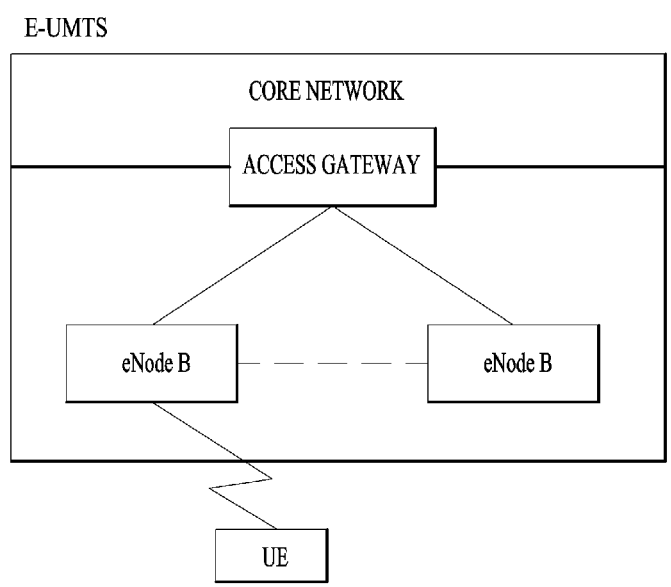
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
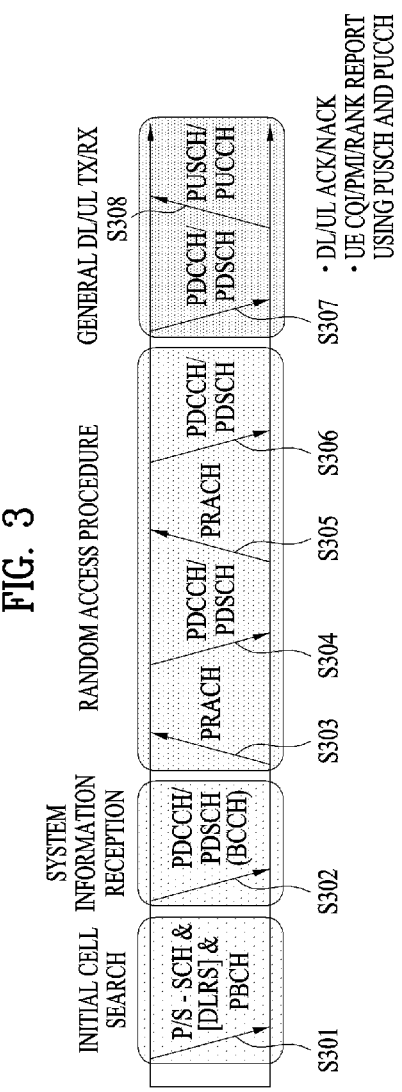
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
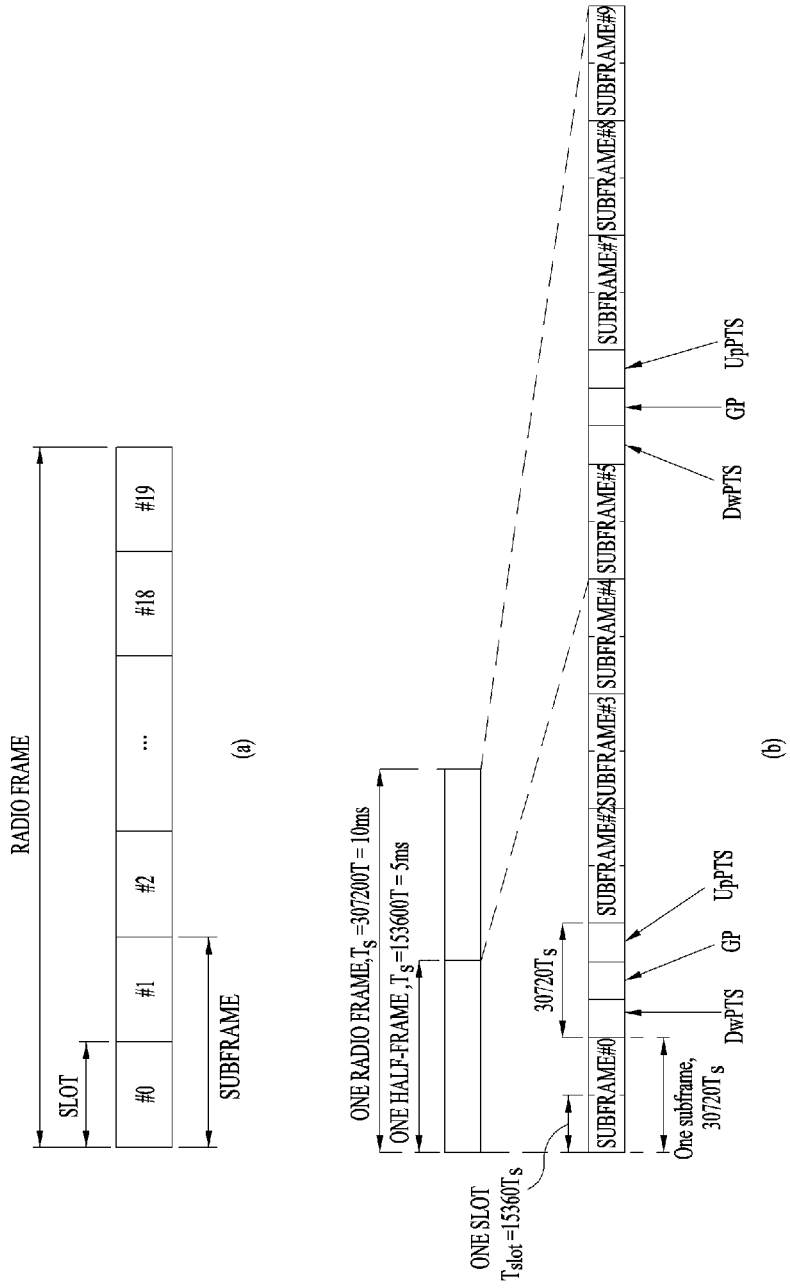
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
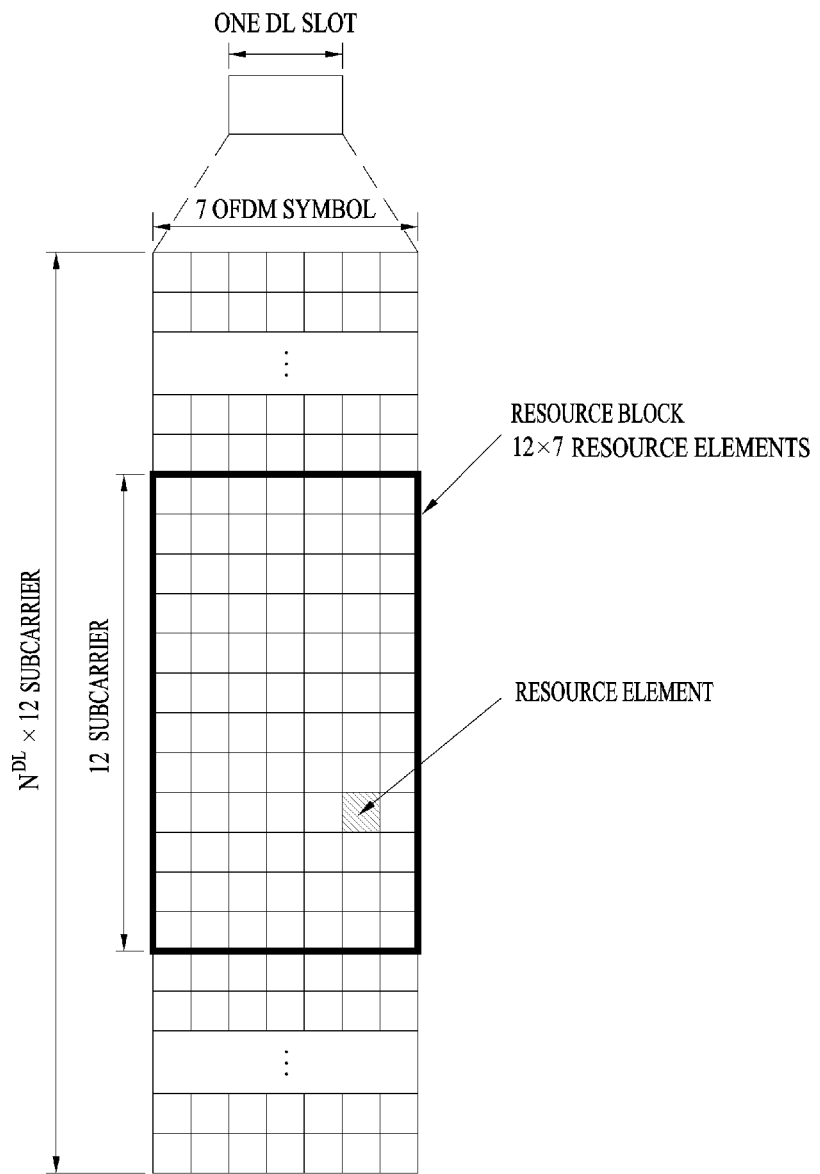
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
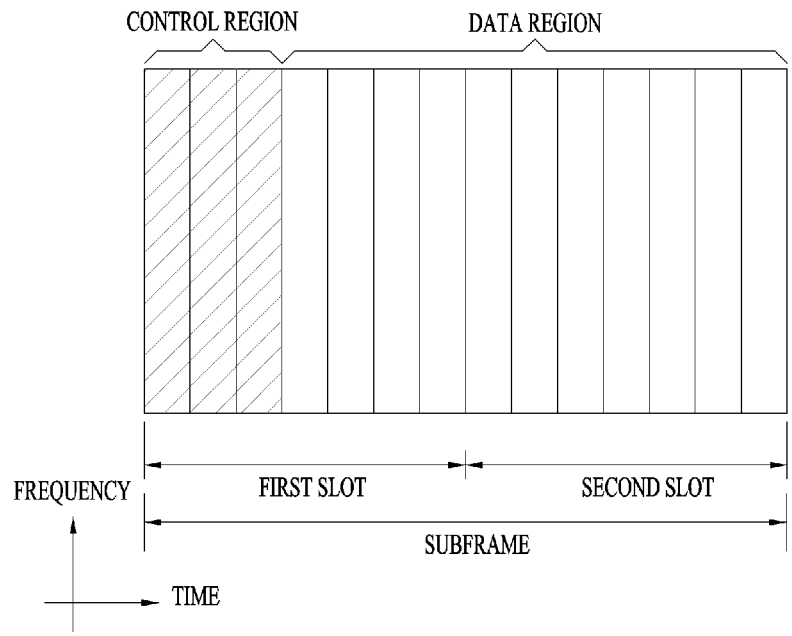
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
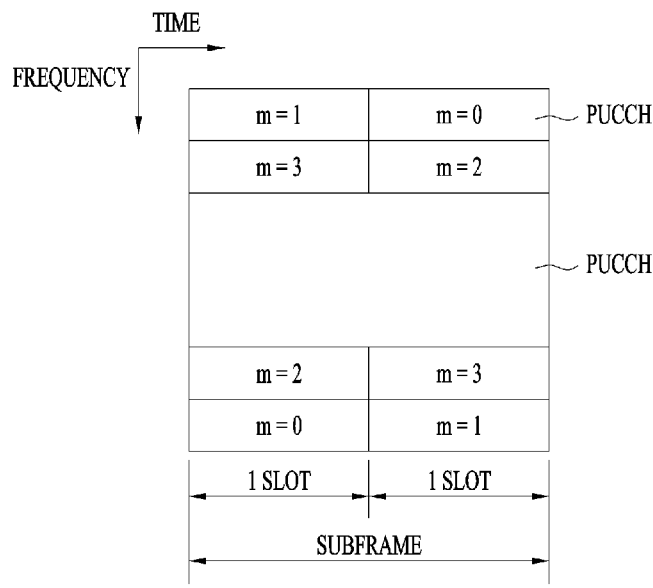
FIG. 7 is a diagram illustrating a structure of an uplink subframe used in LTE.

FIG. 7 is a diagram illustrating a structure of an uplink subframe used in LTE.

Referring to FIG. 7, the uplink subframe includes a plurality (e.g., 2) of slots. The slots may include SC-FDMA symbols, the number of which is changed according to CP length. The uplink subframe may be divided into a control region and a data region in the frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH may be used to transmit the following control information.

Scheduling request (SR): Information used to request uplink (UL)-SCH resources. This is transmitted using an on-off keying (OOK) method.

HARQ ACK/NACK: Response signal to downlink data packets on a PDSCH. This indicates whether downlink data packets have successfully been received. 1-bit ACK/NACK is transmitted in response to a single downlink codeword and 2-bit ACK/NACK is transmitted in response to two downlink codewords.

Channel quality indicator (CQI): Feedback information for a downlink channel. CSI includes a channel quality indicator (CQI) and multiple input multiple output (MIMO)-related feedback information includes a rank indicator (RI), a precoding matrix indicator (PMI) and a precoding type indicator (PTI). 20 bits are used per subframe.

The amount of control information (UCI) transmittable by a UE on a subframe depends on the number of SC-FDMA symbols available in control information transmission. The SC-FDMA symbols available in control information transmission mean SC-FDMA symbols excluding SC-FDMA symbols for reference signal transmission in a subframe, and a last SC-FDMA symbol of the subframe is also excluded in case of a subframe in which a sounding reference signal (SRS) is configured. A reference signal is used for coherent detection of a PUCCH.

Hereinafter, cooperative multipoint (CoMP) transmission/reception will be described.

A system of LTE-A or later has introduced a method of enabling cooperation among several cells to increase system performance. Such a method is referred to as cooperative multipoint (CoMP) transmission/reception. CoMP refers to a method of enabling two or more base stations (BSs), access points or cells to cooperate with each other to communicate with a user equipment (UE) in order to improve communication between a specific UE and a BS, access point or cell.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

Figure 8:
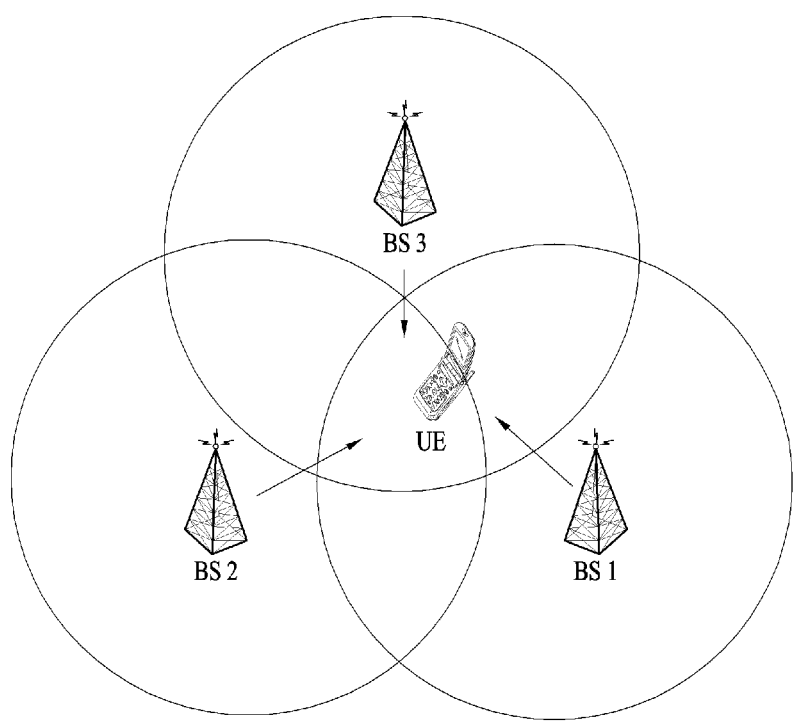
FIG. 8 is a diagram showing an example of performing CoMP.

FIG. 8 is a diagram showing an example of performing CoMP. Referring to FIG. 8, a wireless communication system includes a plurality of BSs BS1, BS2 and BS3 for performing CoMP and a UE. The plurality of BSs BS1, BS2 and BS3 for performing CoMP may cooperate with each other to efficiently transmit data to the UE. CoMP may be largely divided into two schemes depending on whether a BS for performing CoMP transmits data:

Joint processing (JP) (CoMP JP)

CoMP Cooperative scheduling/beamforming (CoMP-CS/CB)

In CoMP-JP, data is simultaneously transmitted from BSs for performing CoMP to one UE and the UE combines the signals received from the BSs to improve reception performance. That is, a CoMP-JP scheme may use data in each point (BS) of a CoMP unit. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points of the CoMP unit do not transmit data to the UE at that time. The point for transmitting the data to the UE may be dynamically selected.

In contrast, in CoMP-CS, data is transmitted from one BS to one UE at an arbitrary time and scheduling or beamforming is performed such that interference caused by another BS is minimized. That is, according to a CoMP-CS/CB scheme, the CoMP units may cooperatively perform beamforming of data transmission to a single UE. Although only a serving cell transmits the data, user scheduling/beamforming may be determined by coordination among the cells of the CoMP unit.

In uplink, coordinated multi-point reception refers to reception of a transmitted signal by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by coordination among the cells of the CoMP unit.

Hereinafter, interference among a plurality of cells will be described.

If two BSs (e.g., BS #1 and BS #2) are adjacently arranged, that is, if coverages of two BSs partially overlap, interference may be caused in a UE served by one BS due to a strong downlink signal from another BS. When inter-cell interference is caused, inter-cell interference may be reduced via an inter-cell cooperative signaling method between two BSs. In various embodiments of the present invention described below, assume that signal transmission and reception are properly performed between two BSs which interfere with each other. For example, assume that a wired/wireless link (e.g., a backhaul link or a Un interface) having good transmission conditions such as transmission bandwidth or time delay is present between two BSs and reliability of transmission and reception of a cooperative signal between the BSs is high. In addition, assume that, when time synchronization between the two BSs is performed within an allowable error range (e.g., boundaries of downlink subframes of the two BSs interfering with each other are aligned), the two BSs clearly recognize an offset between the subframe boundaries of the two BSs.

Referring to FIG. 8 again, BS #1 may be a macro BS for providing a service in a wide region with high transmit power and BS #2 may be a micro BS (e.g., a pico BS) for providing a service in a narrow region with low transmit power. As shown in FIG. 8, if a UE, which is located at a cell edge of BS #2 and is served by BS #2, receives strong interference from BS #1, it may be difficult to efficiently perform communication without appropriate cooperation between cells.

In particular, if a large number of UEs is connected to BS #2 as a micro BS with low power to distribute load of BS #1 as a macro BS for providing a service, a likelihood of inter-cell interference is high. For example, when the UE selects a serving BS, a predetermined conditioning (bias) value may be added to receive power from the micro BS and may not be added to receive power from the macro BS to calculate and compare receive powers of the downlink signals from the respective BSs and, as a result, the UE may select a BS for providing highest downlink receive power as a serving BS. Therefore, more UEs may be connected to the micro BS. In the strength of the downlink signal actually received by the UE, even when the strength of the downlink signal received from the macro BS is significantly stronger, the micro BS may be selected as the serving BS and the UE connected to the micro BS may experience strong interference from the macro BS. In this case, UEs located at the edge of the micro BS may not accurately perform operation due to strong interference from the macro BS, without inter-cell cooperation.

In order to efficiently perform operation even when inter-cell interference is present, appropriate cooperation between two BSs which exchange inter-cell interference should be performed and a signal for enabling such cooperation may be transmitted and received via a link between the two BSs. In this case, when inter-cell interference occurs between the macro BS and the micro BS, the macro BS may control inter-cell cooperation and the micro BS may perform appropriate operation according to a cooperative signal indicated by the macro BS.

The above-described inter-cell interference situation is only exemplary and the embodiments of the present invention are equally applicable to other inter-cell interference situations (e.g., when inter-cell interference occurs between an HeNB of a CSG scheme and a macro BS of an OSG scheme, when a micro BS causes interference and a macro BS receives interference or when inter-cell interference is present between micro BSs or macro BSs.

Based on the above description, the present invention proposes a method of efficiently performing transmission/reception of a control channel when use of radio resources is dynamically changed according to system load states of a plurality of cells.

Here, the control channel includes a legacy physical downlink control channel (PDCCH) and an enhanced PDCCH (EPDCCH) transmitted in a legacy physical downlink shared channel (PDSCH) region. In addition, the PDSCH region is defined as a region composed of OFDM symbols other than the first some OFDM symbols used for (legacy) PDCCH transmission in a subframe composed of a plurality of OFDM symbols. As another example, OFDM symbols used for PDCCH transmission are not present and thus all OFDM symbols of the subframe may be used as a PDSCH region.

Hereinafter, for convenience of description, the present invention will be described based on a 3GPP LTE system. However, the range of the systems to which the present invention is applicable may be extended to other systems in addition to the 3GPP LTE system. The embodiments of the present invention are applicable to the case in which resources on a specific cell (or a component carrier (CC)) are dynamically changed according to the system load state in an environment to which carrier aggregation (CA) is applied. In addition, the embodiments of the present invention are applicable to the case in which use of radio resources is dynamically changed in a TDD system or an FDD system. Hereinafter, for convenience of description of the present invention, assume that cells dynamically change use of radio resources according to the system load states thereof in a TDD system.

Figure 9:
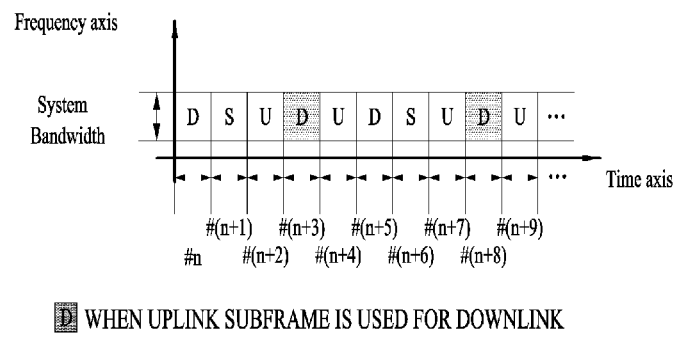
FIG. 9 is a diagram showing the case in which radio resources are dynamically changed in a TDD system.

FIG. 9 shows the case in which, as the amount of downlink load has been increased, a specific cell uses some of legacy uplink subframes for downlink communication in a TDD system environment. In FIG. 9, assume that a legacy uplink-downlink configuration configured via a system information block (SIB) signal is uplink-downlink #0 (that is, DSUUUDSUUU), and a BS notifies a UE of information about uplink subframes (that is, SF #(n+3), SF #(n+8)), the use of which has been changed, via a predefined signal (e.g., i) an RRC signal, ii) an SIB signal or iii) a physical control/data channel).

As an embodiment of the present invention, the UE may be configured not to perform blind decoding (BD) with respect to a common search space (CSS) on a control channel in an uplink subframe, the use of which has been changed.

Such a method may be valid when a predefined specific reference signal (e.g., CRS) used for blind decoding operation of the CSS is not transmitted on the uplink subframe, use of which has been changed. For example, the CRS may not to be transmitted on the uplink subframe, use of which has been changed, in order to reduce interference due to CRS transmission in communication of a neighboring cell which uses the resource as a legacy uplink resource.

More specifically, if the uplink subframe, use of which has been changed, is configured as an EPDCCH monitoring subframe, the UE performs blind decoding with respect to the CSS in the legacy PDCCH region based on the CRS and performs blind decoding with respect to a UE-specific search space (USS) in an EPDCCH region based on a DM-RS. However, when CRS transmission is not performed on the uplink subframe, use of which has been changed (in order to reduce inter-cell interference), the UE may not perform BD operation with respect to the CSS on the legacy PDCCH.

Accordingly, the BS may instruct the UE not to perform CRS based CSS blind decoding on the legacy PDCCH in the uplink subframe, use of which has been changed, via a predefined signal (e.g., a physical layer or higher layer signal) or implicitly disable CRS based CSS blind decoding on the legacy PDCCH in the uplink subframe, use of which has been changed when CRS transmission is not performed on the uplink subframe, use of which has been changed, according to a predefined rule. Alternatively, whether CSS blind decoding is performed on the legacy PDCCH in the uplink subframe, use of which has been changed, may be implicitly checked by the UE depending on whether a specific reference signal (e.g., CRS) used for CSS blind decoding is transmitted in the uplink subframe, use of which has been changed, without transmitting, from the BS, an additional signal indicating that CSS blind decoding is not performed.

Further, the present invention is applicable in a manner of enabling the UE to restrictively perform only USS blind decoding in the EPDCCH region in the uplink subframe, use of which has been changed. In addition, the present invention is applicable to the case in which the CSS is implemented in the PDCCH region based on the CRS or the EPDCCH region based on the CRS (that is, the present invention is not applicable to the case in which the CSS is implemented in the EPDCCH region based on the DM-RS).

As another embodiment of the present invention, when a specific reference signal used for blind decoding of the CSS is not transmitted in the uplink subframe, use of which has been changed, and thus blind decoding operation of the CSS on the control channel is not performed, (exceptively) some or all of the numbers of times of blind decoding of the legacy CSS may be configured to be reassigned as the number of times of blind decoding of the USS in the uplink subframe, use of which has been changed.

Reassigning some or all of the numbers of times of CSS blind decoding as the number of times of USS blind decoding may be performed by a predefined configuration. Here, the cell may notify the UE of configurations related to reassignment of the number of times of blind decoding via a predefined signal (e.g., a physical layer or higher layer signal) or enable the UE to confirm information about reassignment of the number of times of blind decoding based on predefined configurations.

Alternatively, configurations related to reassignment of the number of times of blind decoding may be restrictively applicable only when some or all of i) the type of a DCI format monitored by the UE, ii) the type of a transmission mode, iii) whether a total number of resource elements (REs) used for control information transmission on an EPDCCH set in which a USS is implemented is greater than a predefined threshold (e.g., 104), iv) the type of cyclic prefix (CP), v) the type of a subframe (e.g., normal/extended/special subframe), vi) the type of a special subframe configuration, vii) whether system bandwidth is greater than a predefined threshold (e.g., 25 RBs) and/or viii) the type of an EPDCCH set in which a USS is implemented (e.g., localized/distributed EPDCCH set).

Accordingly, as an embodiment of reassignment of the number of times of blind decoding according to the present invention, reassignment of the number of times of blind decoding may be configured to be restrictively performed at the same aggregation level (AL).

In a normal subframe (normal CP) or special subframe configuration #3/4/8 (normal CP) environment, when a total number of REs used for control information transmission on an EPDCCH set in which a USS is implemented is less than a predefined threshold (e.g., 104) or when system bandwidth is equal to or greater than a predefined threshold (e.g., 25 RBs) and, at the same time, a DCI format monitored by the UE is DCI format 2 series, a minimum aggregation level at which USS blind decoding operation of the UE is performed on the EPDCCH set is increased to 2. In this case, as another embodiment, the number of times of CSS blind decoding at a specific aggregation level may be reassigned as the number of times of USS blind decoding at a specific aggregation level according to a predefined rule.

As a detailed example, when the UE performs USS blind decoding at aggregation level {2, 4, 8, 16, 31} (that is, blind decoding configurations {8, 4, 2, 1, 0} at AL {2, 4, 8, 16, 32}) on the distributed EPDCCH set defined by four PRB pairs, the number of times of CSS blind decoding at aggregation level {4, 8} in the CSS (that is, blind decoding configurations {4, 2} at AL {4, 8}) may be configured to be reassigned as the number of times of blind decoding at aggregation level {8, 16} in the USS. That is, if the minimum aggregation level (AL) of the number of times of USS blind decoding on the EPDCCH set is set to 2, the number of times of blind decoding is reassigned between "AL N*2" on the EPDCCH set and "AL N" in the CSS. As another example, if the minimum aggregation level (AL) of the number of times of USS blind decoding on the EPDCCH set is set to 2, the number of times of blind decoding is reassigned between "AL N/2" on the EPDCCH set and "AL N" in the CSS.

In the above-described embodiments of the present invention, not only the condition that the minimum aggregation level of the USS blind decoding operation of the UE on the EPDCCH set on which the USS is implemented but also some of the conditions including i) the type of a DCI format monitored by the UE, ii) the type of a transmission mode, iii) the type of cyclic prefix (CP), iv) the type of a subframe (e.g., normal/extended/special subframe), v) the type of a special subframe configuration, vi) whether system bandwidth is greater than a predefined threshold (e.g., 25 RBs) and/or vii) the type of an EPDCCH set in which a USS is implemented (e.g., localized/distributed EPDCCH set) are further considered such that the number of times of CSS blind decoding at a specific aggregation level is configured to be reassigned as the number of times of USS blind decoding at a specific aggregation level.

In addition, in the present invention, additionally, if the number of times of USS blind decoding at the specific aggregation level exceeds a maximum number of times of blind decoding at the aggregation level due to reassignment of the number of times of CSS blind decoding, the remaining number of times of blind decoding exceeding the maximum number of times of blind decoding may be configured to be omitted.

Alternatively, if the number of times of USS blind decoding at the specific aggregation level exceeds the maximum number of times of blind decoding at the aggregation level due to reassignment of the number of times of CSS blind decoding, exceptively, the remaining number of times of blind decoding may be configured to be sequentially and maximally assigned starting from the predefined specific aggregation level of the USS. For example, the remaining number of times of blind decoding may be sequentially and maximally assigned starting from a lowest aggregation level in ascending order or starting from a highest aggregation level in descending order. In particular, the number of times of blind decoding left even after assignment is sequentially performed starting from the specific aggregation level may be configured to be omitted. For example, the maximum number of times of USS blind decoding at the specific aggregation level on the EPDCCH set may be limited to a maximum number of EPDCCH candidates at the specific aggregation level, which may be derived from the EPDCCH set. For example, if a specific EPDCCH set defined by two PRB pairs is composed of a total of eight ECCEs, the maximum number of times of blind decoding of the aggregation level in the EPDCCH set becomes a total of 4 (that is, 4×2 ECCEs=8 ECCEs). Accordingly, four times of blind decoding may be assigned to the aggregation level 2 and then the remaining number of times of blind decoding may be assigned to another aggregation level.

In addition, as a second embodiment of reassignment of the number of times of blind decoding of the present invention, the numbers of times of CSS blind decoding to be reassigned may be preferentially combined without distinction of aggregation level thereof and then be reassigned as the numbers of times of USS blind decoding at specific aggregation levels. Here, the combined number of times of CSS blind decoding may be configured to be sequentially and maximally assigned starting from a predefined specific aggregation level of the USS. For example, the combined number of times of CSS blind decoding is maximally assigned starting from a lowest aggregation level in ascending order or starting from a highest aggregation level in descending order. In addition, the number of times of blind decoding left (unassigned) after applying the present invention may be configured to be omitted.

In addition, whether the combined number of times of CSS blind decoding is sequentially (e.g., in ascending order or in descending order) and maximally assigned starting from a predefined relatively high aggregation level of the USS or is sequentially (e.g., in ascending order or in descending order) and maximally assigned starting from a predefined relatively low aggregation level may be configured to be defined according to the type (e.g., localized/distributed EPDCCH set) of the EPDCCH set in which the USS is implemented. Here, if the USS is implemented in the distributed EPDCCH set, the combined number of times of CSS blind decoding is sequentially (e.g., in ascending order or in descending order) and maximally assigned starting from a predefined relatively high aggregation level of the USS, but, if the USS is implemented in the localized EPDCCH set, the combined number of times of CSS blind decoding is sequentially (e.g., in ascending order or in descending order) and maximally assigned starting from a predefined relatively low aggregation level.

Additionally, in addition to the condition on the type of the EPDCCH set in which the USS is implemented, some of the predefined conditions including i) the type of a DCI format monitored by the UE, ii) the type of a transmission mode, iii) whether a total number of resource elements (REs) used for control information transmission on an EPDCCH set in which a USS is implemented is greater than a predefined threshold (e.g., 104), iv) the type of cyclic prefix (CP), v) the type of a subframe (e.g., normal/extended/special subframe) and vi) the type of a special subframe configuration, vii) whether system bandwidth is greater than a predefined threshold (e.g., 25 RBs) are further considered. Accordingly, the combined number of times of CSS blind decoding may be set to be sequentially (e.g., in ascending order or in descending order) and maximally assigned starting from a predefined relatively high aggregation level or starting from a predefined relatively low aggregation level based on the additional conditions.

In addition, all examples according to the second embodiment for reassignment of the number of times of blind decoding of the present invention are applicable to the case in which the remaining number of times of blind decoding is sequentially and maximally assigned starting from the predefined specific aggregation level of the USS in the first embodiment for reassignment of the number of times of blind decoding. For example, the second embodiment is applicable to the case in which the number of numbers of blind decoding is maximally assigned starting from a lowest aggregation level in ascending order or the case in which the number of numbers of blind decoding is maximally assigned starting from a highest aggregation level in descending order.

In the present invention, when a specific reference signal used for blind decoding of the CSS is not transmitted on the uplink subframe, use of which has been changed, and thus blind decoding operation of the CSS on the control channel is configured not to be performed, exceptively, some or all of the numbers of times of blind decoding of the legacy CSS may be configured to be omitted in the uplink subframe, use of which has been changed.

For example, the cell may notify the UE of information about operation for omitting the number of times of CSS blind decoding via a predefined signal (e.g., a physical layer or higher layer signal) or enable the UE to implicitly confirm information about configurations related to operation for omitting the number of times of CSS blind decoding based on a predefined rule. As another example, whether the number of times of CSS blind decoding in the uplink subframe, use of which has been changed, is omitted may be implicitly confirmed by the UE, depending on whether a specific reference signal (e.g., CRS) used for CSS blind decoding is transmitted on the uplink subframe, use of which has been changed, without transmitting, from the BS, an additional signal indicating that the number of times of CSS blind decoding is omitted.

In the present invention, the uplink subframe, use of which has been changed, may be configured to be regarded as a subframe on which USS monitoring operation is always performed on the EPDCCH. Such configurations are particularly efficient when the CRS used for USS/CSS blind decoding operation on the legacy PDCCH is not transmitted on the uplink subframe, use of which has been changed. Further, the cell may notify the UE of whether the above configurations are applied or of information about the positions (times) of the subframes to which the configurations are applied via a predefined signal (e.g., a physical layer or higher layer signal) or enable the UE to implicitly confirm the above configurations based on a predefined rule. Alternatively, whether the above configurations are applied or the information about the positions (times) of the subframes to which the configurations are applied may be set to be implicitly confirmed by the UE depending on whether a specific reference signal (e.g., CRS) used for USS/CSS blind decoding operation is transmitted on the uplink subframe, use of which has been changed, without transmitting an additional signal (for regarding the uplink subframe, use of which has been changed, as a subframe in which USS monitoring operation on the EPDCCH is always performed) from the BS.

In addition, interference attributes (or interference strengths) received on the uplink subframes, use of which has been changed, of a specific cell may not be constant per uplink subframe, use of which has been changed, due to independent radio resource use change operation of neighboring cells. Accordingly, in the embodiment of the present invention, the type (e.g., localized/distributed EPDCCH set) of the EPDCCH set transmitted on the uplink subframe, use of which has been changed, may be restricted to a specific type.

In an environment in which interference attributes (or interference strengths) are severely changed, the distributed EPDCCH type transmitted using a random beamforming method may have higher reliability than that of the localized EPDCCH type transmitted using a beamforming method. In addition, in a subframe statically used for a downlink, since interference of a neighboring cell is constant (or static), the localized EPDCCH type for beamforming is used, but, in a dynamically changed downlink subframe, since interference of a neighboring cell is dynamically changed, the distributed EPDCCH type is used. Accordingly, in the uplink subframe, use of which has been changed, only the distributed EPDCCH set type may be set to be transmitted.

Further, the cell may notify the UE of information as to whether the above configurations (of the type of the EPDCCH set transmitted on the changed uplink subframe) are applied or of information about the positions (times) of the subframes, to which the above configurations are applied, via a predefined signal (e.g., a physical layer or higher layer signal) or enable the UE to implicitly confirm such information based on a predefined rule. As another example, on the uplink subframe, use of which has been changed, only the localized EPDCCH set type may be configured to be transmitted.

In addition, in the present invention, in the uplink subframe, use of which has been changed, specific data transmission schemes (or specific transmission modes) based on DCI 1A may be configured not to be used. Such configurations are particularly efficient when the CRS is not transmitted on the uplink subframe, use of which has been changed. That is, among the data transmission schemes based on DCI 1A, a transmit diversity method requiring CRS-based decoding operation and/or a single-antenna port method may be configured to be unsupported in the uplink subframe, use of which has been changed.

In addition, in the present invention, in the uplink subframe, use of which has been, all data transmission schemes based on DCI 1A and all data transmission schemes (or transmission modes) requiring CRS based decoding operation may not be supported. Such schemes may be efficient when the CRS is not transmitted on the uplink subframe, use of which has been changed. That is, among the data transmission schemes based on DCI 1A, a transmit diversity method requiring CRS-based decoding operation (and/or a single-antenna port method) may be configured to be unsupported in the uplink subframe, use of which has been changed. Here, for example, if the data transmission schemes (or transmission modes based on DCI 1A are configured to be unsupported in the uplink subframe, use of which has been changed, the BS may notify the UE of information related thereto via a predefined signal, thereby reducing an error (false alarm) probability for detection of DCI 1A from a USS/CSS.

Additionally, in the uplink subframe, use of which has been changed, only data transmission schemes (or transmission modes) requiring decoding operation based on a reference signal (e.g., a DRS or DM-RS) other than a CRS may be configured to be supported. For example, although transmission mode 4 (that is, transmission mode requiring CRS-based decoding operation (that is, a transmit diversity scheme)) was previously configured for data transmission on a downlink subframe, the UE may regard transmission mode 9 (that is, a transmission mode requiring decoding operation based on a DM-RS, not based on a CRS) as being applied on the uplink subframe, use of which has been changed. Therefore, the respective transmission modes (or data transmission schemes) of the downlink subframe on the SIB applied by the UE and the uplink subframe, use of which has been changed, may not be identical.

Further, the cell may notify the UE of information as to whether the above configurations (of the specific data transmission schemes (or the specific transmission modes)) are applied or of information about the positions (times) of the subframes, to which the above configurations are applied, via a predefined signal (e.g., a physical layer or higher layer signal) or enable the UE to implicitly confirm such information based on a predefined rule. Alternatively, the BS may enable the UE to implicitly confirm whether the above configurations (of the specific data transmission schemes (or the specific transmission modes)) are applied or of information about the positions (times) of the subframes, to which the above configurations are applied, depending on whether a CRS is transmitted on the uplink subframe, use of which has been changed, without additional signal transmission from the BS.

In addition, in the present invention, in the uplink subframe, use of which has been changed, specific data transmission schemes based on a semi-persistent scheduling (SPS) method (or specific SPS transmission modes) may be configured to be not performed. Such configurations are particularly efficient i) when radio resource use change periodicity is relatively short so as not to support stable SPS operation (e.g., SPS HARQ timeline), ii) when interference attributes (or interference strengths) received on the uplink subframes, use of which has been changed, are not constant so as not to guarantee stable SPS data transmission, or iii) when a CRS is configured to be not transmitted in the uplink subframe, use of which has been changed, so as not to support methods requiring CRS-based decoding operation among the SPS data transmission schemes (or specific SPS transmission modes). For example, if the specific data transmission schemes (or specific SPS transmission modes) of the SPS method are configured to be unsupported in the uplink subframe, use of which has been changed, the BS may notify the UE of information related thereto via a predefined signal to reduce an error (that is, false alarm) probability for SPS C-RNTI detection from a USS/CSS. Additionally, in the uplink subframe, use of which has been changed, only the specific data transmission schemes of the SPS methods (or the specific SPS transmission modes) requiring decoding operation based on a reference signal (e.g., a DRS or DM-RS), not based on a CRS, may be configured to be supported.

Further, the cell may notify the UE of information as to whether the above configurations (as to whether the specific data transmission schemes of the SPS method (or the specific transmission modes) are performed in the uplink subframe, use of which has been) are applied or of information about the positions (times) of the subframes, to which the above configurations are applied, via a predefined signal (e.g., a physical layer or higher layer signal) or enable the UE to implicitly confirm such information based on a predefined rule. Alternatively, the BS may enable the UE to implicitly confirm whether the above configurations (as to whether the specific data transmission schemes of the SPS method (or the specific transmission modes) are performed in the uplink subframe, use of which has been changed) are applied or of information about the positions (times) of the subframes, to which the above configurations are applied, depending on whether a CRS is transmitted on the uplink subframe, use of which has been changed, without additional signal transmission from the BS.

Additionally, if the CRS is not transmitted in the uplink subframe, use of which has been changed, in the present invention, a PBCH, an SIB and/or a random access response (RAR) message requiring CRS-based decoding operation may not be transmitted on the uplink subframe, use of which has been changed.

In the present invention, i) CRS/CSI-RS rate matching information, ii) resource element (RE) mapping information, iii) DM-RS rate matching information and/or iv) start symbol position information of a control channel (e.g., EPDCCH set) transmitted on a legacy downlink subframe and an uplink subframe, use of which has been changed may be independently defined.

Here, the legacy downlink subframe may restrictively mean subframes designated as downlink subframes on SIB information or subframes used for downlink communication without change of use among subframes designated as downlink subframes on SIB information. Such configurations are efficient when the types of the reference signals respectively transmitted on the legacy downlink subframe and the uplink subframe, use of which has been changed, are different. For example, if the CRS is configured to be not transmitted on the uplink subframe, use of which has been changed, rate matching information considering CRS transmission of the serving cell for the EPDCCH set transmitted on the (uplink) subframe, use of which has been changed, or rate matching information considering CRS interference avoidance operation of the neighboring cell may be invalid.

In addition, if the CRS is configured to be not transmitted on the uplink subframe, use of which has been changed, since a PDCCH requiring CRS-based decoding operation is not transmitted on the (uplink) subframe, use of which has been changed, EPDCCH set start symbol position information considering PDCCH transmission may be invalid. In this case, the EPDCCH set start symbol position may be defined as a first OFDM symbol of a subframe.

For example, the cell may notify the UE of i) CRS/CSI-RS rate matching information, ii) resource element mapping information, iii) DM-RS rate matching information and/or iv) start symbol position information defined on the uplink subframe, use of which has been changed, independent of the legacy downlink subframe via a predefined signal (e.g., a physical layer or higher layer signal) or v) enable the UE to implicitly confirm such information based on predefined configurations. Alternatively, such information may be configured to be implicitly confirmed depending on whether a specific reference signal (e.g., a CRS) is transmitted on the uplink subframe, use of which has been changed, without additional signal transmission from the BS.

Additionally, if the specific reference signal (e.g., the CRS) is not transmitted on the uplink subframe, use of which has been changed, the number of REs available for EPDCCH transmission may be greater than that of the legacy downlink subframe on which the specific reference signal (e.g., the CRS) is transmitted. Accordingly, in the present invention, a threshold of the number of REs available for EPDCCH transmission on one PRB pair (used to determine a minimum aggregation level in the search region) may be independently designated for the uplink subframe, use of which has been changed.

In addition, if the specific reference signal (e.g., the CRS) is not transmitted on the uplink subframe, use of which has been changed, inter-cell interference attributes of that subframe may be different from those of the legacy downlink subframe on which the specific reference signal (e.g., the CRS) is transmitted. Accordingly, in the present invention, a data/control channel (e.g., PDSCH/EPDCCH) related interference avoidance method for an uplink subframe, use of which has been changed, may be defined differently from or independently of the legacy downlink subframe in consideration of different interference attributes in the uplink subframe, use of which has been changed.

In the present invention, at least one of the size/position/number of control channels (e.g., EPDCCH sets) transmitted on a legacy downlink subframe and an uplink subframe, use of which has been changed may be configured to be independently defined in the legacy downlink subframe and the uplink subframe, use of which has been changed. Such configurations are particularly efficient when bandwidth (or the number of resource blocks (RBs)) used for data/control information transmission is differently defined on the legacy downlink subframe and the uplink subframe, use of which has been changed. This is because, in order to guarantee stable communication of a legacy UE on the uplink subframe, use of which has been changed, and reliable communication based on accurate channel information, uplink control information (e.g., UL ACK/NCK, CQI/RI/PMI, etc.) transmission operation of a serving cell is maintained such that bandwidth used for actual data transmission on the uplink subframe, use of which has been changed, (e.g., relatively small bandwidth) may be defined differently from that of the legacy downlink subframe.

Accordingly, in consideration of relatively small bandwidth used for actual data/control information transmission on the uplink subframe, use of which has been changed, information about i) the number of PRB pairs configuring an EPDCCH set, ii) the positions of the PRB pairs in which the EPDCCH set is configured, and/or iii) the number of EPDCCH sets may be configured differently from or independently of the legacy downlink subframe. For example, on the uplink subframe, use of which has been changed, i) PRB pairs configuring EPDCCH sets relatively less in number than the number of PRB pairs configuring EPDCCH sets on the legacy uplink subframe may be configured and/or ii) a relatively small number of EPDCCH sets and/or iii) the positions of the PRB pairs in which the EPDCCH sets considering relatively small bandwidth are configured may be configured.

In addition, in the present invention, since ICIC regions for the frequency resource region may be differently configured in a subframe used for downlink and a subframe used for uplink by a neighboring cell, the positions of the EPDCCH sets may be differently configured. For example, the cell may notify the UE of information about at least one of the size/position/number of control channels (e.g., EPDCCH sets) defined independently of the legacy downlink subframe on the uplink subframe, use of which has been changed, via a predefined signal (e.g., a physical layer or higher layer signal) or enable the UE to implicitly confirm such information based on a predefined rule.

In addition, according to the present invention, configuration information of the EPDCCH sets (e.g., the number of PRB pairs configuring the EPDCCH sets, the positions of the PRB pairs in which the EPDCCH sets are configured and/or the number of EPDCCH sets) may be differently defined according to subframe type.

Here, the subframe type may be defined as a static subframe and a flexible subframe. More specifically, the flexible subframe may be defined as a subframe (re-)used for a purpose different from that of an uplink-downlink (UL-DL) configuration on a legacy SIB, a subframe (re-)used for a purpose different from that of a subframe configured in a previous reconfiguration period or a subframe (re-)used for a purpose different from that of a reference HARQ timeline. In contrast, the static subframe may be defined as a subframe (re-)used for the same purpose as an uplink-downlink (UL-DL) configuration on an SIB, a subframe (re-)used for the same purpose as a subframe configured in a previous reconfiguration period or a subframe (re-)used for the same purpose as a reference HARQ timeline.

In particular, a reference downlink/uplink HARQ timeline (that is, a HARQ timeline configured for a purpose of maintaining a stable HARQ timeline regardless of (re-)change of a UL-DL configuration) may be defined as i) a downlink/uplink HARQ timeline of a UL-DL configuration including a union of downlink subframes/an intersection of uplink subframes of reconfigurable UL-DL configuration candidates or ii) a downlink/uplink HARQ timeline of a UL-DL configuration including an intersection of downlink subframes/a union of uplink subframes of reconfigurable UL-DL configuration candidates.

Accordingly, in the present invention, for a specific subframe type, a plurality of EPDCCH set configuration information may be signaled via a predefined signal (e.g., a higher layer signal (e.g., RRC) or which EPDCCH set is used may be indicated via an additional predefined signal (e.g., a physical layer signal (e.g., a (E)PDCCH, MAC) or a higher layer signal). Here, some or all of the plurality of EPDCCH set configuration information may be defined as i) the number of PRB pairs, ii) the PRB pair positions, iii) virtual cell identifiers (IDs) and/or iv) antenna port configurations. Further, such configurations may be restrictively applied to a set of flexible subframes (e.g., a set of flexible downlink subframes).

This is because interference properties on the flexible frame may be changed depending on use of the subframe by the neighboring cell. For example, the type of interference from the neighboring cell (e.g., interference caused by downlink/uplink communication of the neighboring cell) or the resource position where interference is received from the neighboring cell (interference occurs in consecutive RBs when the neighboring cell uses that subframe for uplink communication) may be changed depending use of the subframe by the neighboring cell.

In addition, the serving cell may adaptively configure EPDCCH sets advantageous in interference avoidance according to change in interference properties on the flexible subframe by applying the above-described method.

Additionally, in such an embodiment (that is, indicating whether a specific EPDCCH set is used), validation of a plurality of pre-configured EPDCCH sets may be interpreted as being associated with a reconfiguration message. Here, validation of a specific EPDCCH set (among the plurality of pre-configured EPDCCH sets) may be configured to be determined via a predefined field (or bits) included in a reconfiguration message or in association with specific UL-DL (re)configuration information according to a predefined rule.

As another example, a static subframe set (e.g., a static downlink subframe set) may be configured based on EPDCCH monitoring configuration information configured via a higher layer signal (e.g., RRC signaling) equally to a legacy method (that is, a previous method including 3GPP LTE release 11). In this case, the EPDCCH monitoring configuration is composed of one or two EPDCCH sets and a given number of times of blind decoding may be defined to be applied to one or more EPDCCH sets. Such an embodiment is efficiently used to prevent ambiguity of the EPDCCH set configuration or the EPDCCH monitoring configuration when the UE performs predefined fallback mode operation (for example, when fallback operation is performed with a UL-DL configuration on an SIB to perform communication, due to reception failure of a reconfiguration message). In addition, such an embodiment is efficient because a possibility that interference properties on the static subframe are more constant than those of the flexible subframe is high.

In addition, in the present invention, UL-DL configuration information may be configured to be indicated per transmission point (TP) (or cell) via a predefined format or signal. Here, for RRM/RLM/CSI measurement operation per transmission point (or cell) of the UE, (some or all) non-zero power CSI-RS configuration information per transmission point (or cell) may be differently configured and thus UL-DL configuration information may be defined according to non-zero power CSI-RS configuration information.

Additionally, two EPDCCH sets are respectively configured on different transmission points (or cells) and use of a specific subframe is differently defined between transmission points (or cells) (e.g., TP #A uses the subframe for downlink and TP #B uses the subframe for uplink at a specific subframe position), EPDCCH monitoring operation of the UE needs to be defined on the specific subframe. Accordingly, in such a situation, use of the specific subframe may be configured to monitor only EPDCCH sets having quasi co-location (QCL) with a transmission point (or cell) which uses the specific subframe as a downlink. In this case, without dividing the number of times of blind decoding (BD) for a specific aggregation level (AL) between two EPCCH sets, only one EPDCCH may be regarded as being configured and blind decoding operation (of the UE) in the USS and/or CSS may be performed (based on the number of times of BD corresponding to the case in which one EPDCCH set is configured).

In addition, in the present invention, specific EPDCCH set configuration information (e.g., the number of PRB pairs configuring EPDCCH sets, positions of the PRB pairs in which the EPDCCH sets are configured and/or the number of EPDCCH sets) may be previously linked to a downlink subframe/uplink subframe combination (or uplink-downlink configuration combination) of each transmission point (or cell) and EPDCCH monitoring may be configured to performed according to the linked EPDCCH set configuration information if which transmission point (or cell) is for a downlink or uplink is determined via a reconfiguration message.

For example, a rule for previously linking i) CSI-RS measurement related configuration information, ii) interference measurement resource (IMR) related configuration information and/or iii) PQI status (e.g., the number of CRS antenna ports for PDSCH RE mapping), CRS frequency shift for PDSCH RE mapping), MBSFN subframe configuration for PDSCH RE mapping, zero power CSI-RS resource configuration for PDSCH RE mapping, PDSCH starting position for PDSCH RE mapping, CSI-RS resource configuration identity for PDSCH RE mapping) interpretation related configuration information to a downlink subframe/uplink subframe combination (or uplink-downlink configuration combination) of each transmission point (or cell) and following the linked configuration information if which transmission point (or cell) is for a downlink or uplink is determined via a reconfiguration message may be configured. Additionally, this method is restrictively applied to a specific subframe type (e.g., a flexible subframe type).

As another embodiment of the present invention, when use of radio resources on a specific cell (or a component carrier) is dynamically changed in an environment to which a carrier aggregation (CA) scheme is applied, cross carrier scheduling (CCS) operation from a control channel (e.g., an EPDCCH or a PDCCH) transmitted on uplink subframes, use of which has been changed, may be configured to be unsupported. Such a configuration is efficient when interference attributes (or interference strengths) received on the uplink subframes, use of which has been changed, are not constant so as not to guarantee stable CCS operation or when the specific subframe used for a downlink is not statically (or semi-statically) maintained. For example, when CCS from the control channel is not supported on the uplink subframes, use of which has been changed, although CCS operation from the control channel (e.g., the EPDCCH or PDCCH) transmitted on the legacy downlink subframe (or the downlink subframe, use of which is fixed) of a specific cell is supported, CCS operation may not be supported only in the uplink subframes, use of which has been changed, of the cell.

In addition, when CCS operation from the control channel (e.g., the EPDCCH or PDCCH) transmitted on the uplink subframes, use of which has been changed (or the subframes configured to be used for a downlink based on dynamic use change operation) is configured to be unsupported according to the present invention, automatic switching may be performed using a self scheduling scheme on the uplink subframes, use of which has been changed (or the subframes configured to be used for a downlink based on dynamic use change operation). For example, the cell may notify the UE of information as to whether the above-described configuration is applied or information about the positions (times) of the subframes, to which the configuration is applied, via a predefined signal (e.g., a physical layer or higher layer signal) or enable the UE to implicitly confirm such information based on a predefined rule.

As another embodiment of the present invention, QCL assumption for an EPDCCH set may be differently defined according to subframe types. Here, subframe types may be divided into a legacy downlink subframe type and an uplink subframe type, use of which has been changed, or a downlink subframe type on an SIB and a subframe type which is a (legacy) uplink subframe on an SIB but is used for downlink communication due to change of use.

For example, in a subframe which is statically used for a downlink, since channel state information (CSI) (or channel state) is stable, CoMP operation is applicable, but, in a subframe, use of which is dynamically changed, since it may be difficult to apply CoMP, an EPDCCH may be configured to be transmitted (or received) to (or from) a serving cell (or a serving transmission point). Accordingly, QCL assumption for the EPDCCH set is differently or independently defined according to subframe types.

In addition, since the type of the transmitted reference signal may be changed according to subframe types, QCL assumption for the EPDCCH set is differently or independently defined according to subframe types. For example, since a specific reference signal (e.g., a CRS or CSI-RS) may not be transmitted on an uplink subframe, use of which has been changed, QCL assumption for the EPDCCH set may be differently or independently defined according to subframe types. Further, the cell may notify the UE of information about different (or independent) QCL assumptions per subframe type via a predefined signal (e.g., a physical layer or higher layer signal) or enable the UE to implicitly confirm such information based on a predefined configuration.

As another embodiment of the present invention, although a flexible subframe is designated as an EPDCCH monitoring subframe, only when the flexible subframe is actually (re) configured to be used for downlink, a rule for actually performing EPDCCH operation (at a UE) may be defined.

Although the above-described embodiments, implementations or proposals of the present invention may be independently embodied, it will be apparent that combinations of at least one or all of the above-described embodiments of the present invention are within the scope of the present invention.

In addition, in the above-described embodiments of the present invention, although the UE may identify a subframe configuration to implicitly determine which configuration/rule is applied, the subframe type may be identified via explicit signaling.

Further, the above-described embodiments of the present invention are restrictively applicable to only the case of setting the mode for dynamically changing use of radio resources or are restrictively applicable to a specific subframe type.

A BS may notify a UE of a configuration according to the above-described embodiments of the present invention and/or information about whether such a configuration is applied via a predefined signal (e.g., a physical layer signal or a higher layer signal).

The embodiments of the present invention are also applicable to the case in which an uplink subframe on an SIB is reconfigured to be used for downlink by a reconfiguration message (that is, a flexible downlink subframe) or the case in which an MBSFN is configured on the subframe (that is, a flexible downlink subframe).

Figure 10:
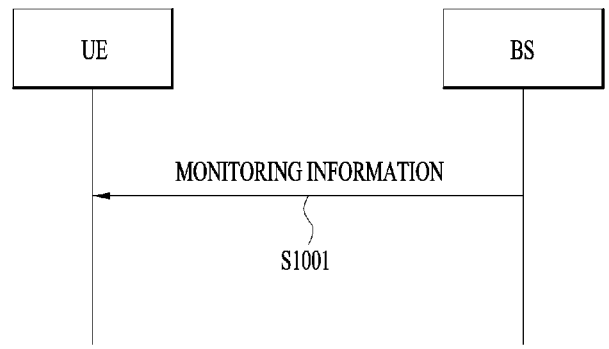
FIG. 10 is a diagram showing a method of monitoring a downlink control channel according to one exemplary embodiment of the present invention.

FIG. 10 is a diagram showing a method of monitoring a downlink control channel according to one exemplary embodiment of the present invention.

Referring to FIG. 10, a UE may receive monitoring information of a control channel (e.g., a PDCCH or an EPDCCH) from a BS and detect a downlink control signal (that is, perform monitoring/blind decoding) according to the received signal.

That is, in step S1001 of FIG. 10, the UE may receive monitoring information according to one embodiment of the present invention from the BS. In S1001, the information/configuration/rule related to detection of the downlink control information by the UE may be configured as described above with reference to the embodiments of the present invention and, in some cases, at least some of the above-described embodiments of the present invention may be combined.

In the method of monitoring the downlink control channel described with reference to FIG. 10, details of the above-described embodiments of the present invention are independently applied or two or more embodiments may be simultaneously applied. Redundant descriptions are avoided for clarity.

Figure 11:
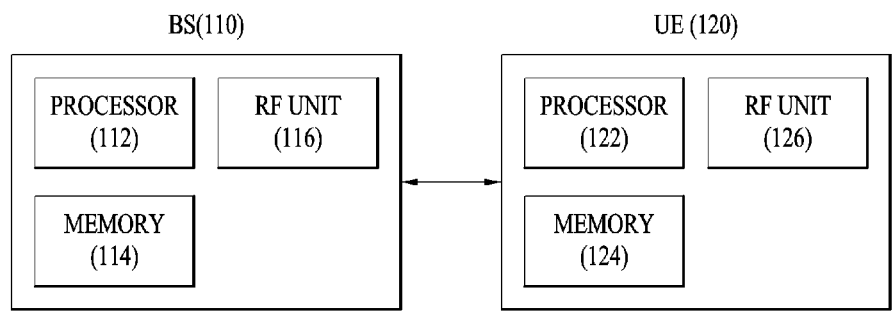
FIG. 11 is a diagram showing a base station (BS) and a user equipment (UE) to which the embodiments of the present invention are applicable.

FIG. 11 is a diagram showing a base station (BS) and a user equipment (UE) to which the embodiments of the present invention are applicable. If a wireless communication system includes a relay, communication in a backhaul link is performed between the BS and the relay and communication in an access link is performed between the relay and the UE. Accordingly, the BS and UE shown in the figure may be replaced with the relay according to situation.

Referring to FIG. 11, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a method and device for monitoring a downlink control channel in a wireless communication system to a 3GPP LTE system has been described, the present invention is applicable to various wireless communication systems, in addition to the 3GPP LTE system.

The invention claimed is:

1. A method of monitoring a downlink control channel of a user equipment (UE) in a wireless communication system, the method comprising:
   receiving a configuration related to a channel state information (CSI) measurement; and
   monitoring the downlink control channel on a specific subframe set of several subframe sets based on parameters for physical downlink shared channel (PDSCH) resource element mapping received via higher layer signaling,
   wherein the parameters include one or more zero power channel state information reference signal (CSI-RS) configurations, when the received configuration indicates several subframe sets in which different CSI measurements are each to be performed for one serving cell.

2. The method according to claim 1, wherein, when the received configuration indicates the several subframe sets, the several subframe sets are linked to different enhanced downlink control channel (EPDCCH) sets.

3. The method according to claim 2, wherein the specific subframe set is configured for the UE to monitor a specific EPDCCH set that is quasi co-located with an uplink-downlink (UL-DL) configuration configured for downlink communication at a time corresponding to the specific subframe set.

4. The method according to claim 1, further comprising:
receiving a reconfiguration message including information indicating the specific subframe set.

5. A user equipment (UE) for monitoring a downlink control channel in a wireless communication system, the UE comprising:
a radio frequency unit; and
a processor,
wherein the processor is coupled to the radio frequency unit and configured to:
receive a configuration related to a channel state information (CSI) measurement, and
monitor the downlink control channel on a specific subframe set of the several subframe sets based on parameters for physical downlink shared channel (PDSCH) resource element mapping received via higher layer signaling, and
wherein the parameters include one or more zero power CSI-reference signal (CSI-RS) configurations, when the received configuration indicates several subframe sets in which different CSI measurements are each to be performed for one serving cell.

6. The UE according to claim 5, wherein, when the received configuration indicates the several subframe sets, the several subframe sets are linked to different enhanced downlink control channel (EPDCCH) sets.

7. The UE according to claim 6, wherein the specific subframe set is configured for the processor to monitor a specific EPDCCH set that is quasi co-located with an uplink-downlink (UL-DL) configuration configured for downlink communication at a time corresponding to the specific subframe set.

8. The UE according to claim 5, wherein the processor is further configured to receive a reconfiguration message including information indicating the specific subframe set.

* * * * *